United States Patent [19]
Ruggerone

[11] 3,773,527
[45] Nov. 20, 1973

[54] METHOD OF PRESERVING COOKED POTATOES

[75] Inventor: Artemio P. Ruggerone, Covina, Calif.

[73] Assignee: Lloyd M. Shapoff, Hawthorne, Calif.

[22] Filed: July 30, 1970

[21] Appl. No.: 64,119

Related U.S. Application Data

[63] Continuation of Ser. No. 703,1841, Jan. 14, 1968, abandoned, Continuation-in-part of Ser. No. 657,903, Aug. 2, 1967, abandoned.

[52] U.S. Cl. ............... 426/106, 99/100 P, 99/189, 99/467, 426/205, 426/227
[51] Int. Cl. ......................... A23b 7/14, B65b 31/00
[58] Field of Search ................. 99/189, 171, 171 S, 99/174, 154, 155, 207, 165, 168, 186–187, 100, 100 P, 103, 143, 467

[56] References Cited
UNITED STATES PATENTS

| | | | |
|---|---|---|---|
| 2,490,951 | 12/1949 | Dunkley | 99/189 |
| R14,489 | 6/1918 | Franks | 99/189 X |
| 2,114,622 | 4/1938 | Bergstein | 99/171 S X |
| 2,838,403 | 6/1958 | Notter | 99/187 X |
| 3,102,778 | 9/1963 | Bedrosian et al. | 99/189 X |
| 3,220,857 | 11/1965 | Hollis, Jr. et al. | 99/207 |
| 3,360,382 | 12/1967 | Miller | 99/189 X |
| 3,393,077 | 7/1968 | Moreau | 99/189 X |
| 3,449,134 | 6/1969 | Leasure et al. | 99/189 |

*Primary Examiner*—Norman Yudkoff
*Assistant Examiner*—Kenneth P. Van Wyck
*Attorney*—Cristie, Parker & Hale

[57] ABSTRACT

Peeled, cooked, and cut fresh potatoes are preserved in a sealed refrigerated container filled with a mixture of carbon dioxide and nitrogen.

7 Claims, 2 Drawing Figures

Patented Nov. 20, 1973 3,773,527
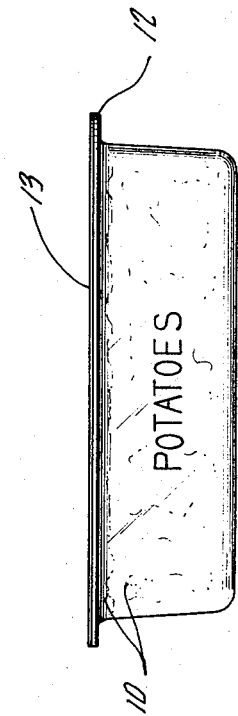
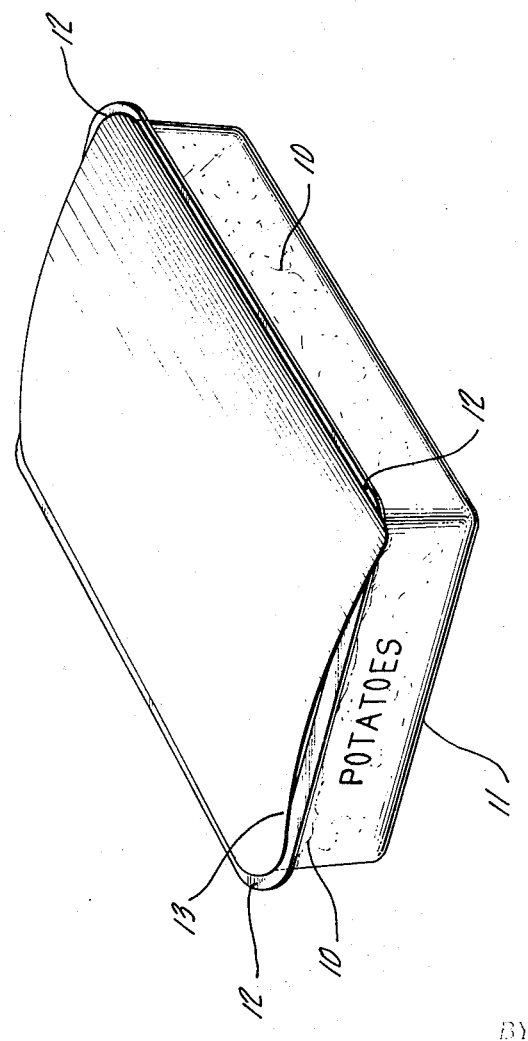
INVENTOR
ARTEMIO P. RUGGERONE
BY
Christie, Parker & Hale
ATTORNEYS

METHOD OF PRESERVING COOKED POTATOES

This invention relates to extending the shelf life of peeled, cooked, and cut potatoes, and is a continuation of Ser. No. 703,841 filed Jan. 19, 1968, now abandoned which is a continuation-in-part application of my copending U.S. Pat. application Ser. No. 657,903, filed Aug. 2, 1967, now abandoned.

Widespread use of pre-peeled and pre-cooked potatoes in consumer packs, particularly in retail merchandising, has been inhibited by difficulties in keeping the product in good condition for the required length of time from the processing plant to the ultimate consumer.

This invention provides method and apparatus for extending the "shelf life" of pre-peeled and pre-cooked potatoes. Such potatoes are normally cut or shredded and sold as "instant" french fries or hash brown potatoes. In accordance with this invention, potatoes, which have been pre-peeled and pre-cooked, are placed in a package which contains a mixture of carbon dioxide and nitrogen gas and which is sealed to keep the gas mixture in the container. Preferably, the sealed container with the potatoes in it is made of an air-impervious material, such as polyvinyl chloride, and is stored at a temperature between about 34° F and about 55° F. Moreover, the gas mixture is preferably flushed through the package prior to sealing to displace ambient air from the product. This is most conveniently accomplished by injecting the gas mixture under positive pressure at one end of the package, and withdrawing air or gas through a vacuum tube at the opposite end of the package. Ordinarily, a small percentage of oxygen originally present in the ambient air in the package is left in the package to inhibit botulism.

The invention will be more fully understood from the following detailed description, and the accompanying drawings, in which:

FIG. 1 is a perspective view of the package prior to sealing; and

FIG. 2 is a cross sectional view of the package after sealing.

Raw potatoes (not shown), preferably those with a high solid content and relatively small in size, i.e., under 6 ounces per potato, are peeled and trimmed, and cooked between about 200° and about 212° F for about 20 minutes. The cooking time and temperature are adjusted so that the potatoes are cooked down all the way through. This is most easily determined by piercing the cooked potatoes with a fork or the like, which should slip easily into a properly cooked potato. If occasional large potatoes are undercooked, they are cut in half during the trimming operation.

After cooking, the potatoes are dipped in a conventional preservative and allowed to cool to room temperature. This normally requires about 4 hours. The cooled potatoes are then placed in a refrigerated room and held there for at least 24 hours, and preferably 48 hours. The refrigerated room is preferably held at about 35° F, and about 50 percent maximum relative humidity. After such treatment, cooked potatoes have a moisture content in the range of about 70 percent to 85 percent by weight.

After storage in the refrigerated room, the cooled potatoes are shredded if they are to be "hash browns" or they are cut into conventional "finger" shapes if they are to be "french fries."

The cut or shredded potatoes 10 are placed in a container 11 which is impervious to oxygen. Preferably, the container is rectangular, open at its top, and has an outwardly extending sealing flange 12 around its periphery. The container is also perferably made of a material, such as polyvinyl chloride, which is impervious to air. A rectangular lid 13 with a periphery matching that of the sealing flange is temporarily deformed to curve concave downwardly about an axis which is generally parallel to the longitudinal axis of the container. The lid and the container are each made with sufficient structural strength to be self-supporting, i.e., retain a fixed shape when standing alone.

With the lid resting loosely on the sealing flange so the container is open at each end, a mixture of carbon dioxide and nitrogen gas is injected into one end of the container. The gas mixture is heavier than the ambient air, and therefore settles to the bottom of the container, displacing the air until the container is filled with carbon dioxide and nitrogen. To speed the displace-ment of the air with the gas mixture, air is withdrawn from the opposite end of the package where the carbon dioxide and nitrogen gas is injected. Preferably, a "head" space is left between the top of the potatoes in the package and the package flange to insure that a trace of oxygen is left in the package to inhibit botulism. For example, for a package which is about 5 inches long, 4-½ inches wide, and about 1-½ inches deep, a head space of about one-fourth inch is adequate. Ordinarily, between about 1 percent and about 5 percent oxygen remaining in the package is adequate to produce the desired inhibition. If too much oxygen is left in the package, any aerobic bacteria which may be present could grow and thus reduce the shelf life of the product. Thereafter, the lid is hermetically sealed to the container around the entire periphery of the lip to form an air-tight package. The lid is also made of an air-impervious material.

Preferably, the mixture injected into the container is between about 30 percent and about 70 percent carbon dioxide, with the balance being nitrogen. Maximum shelf life has been obtained when the mixture is 50 percent carbon dioxide and 50 percent nitrogen for shredded hash brown potatoes, and 70 percent carbon dioxide and 30 percent nitrogen for french fried potatoes.

After the container is flushed with the mixture of carbon dioxide and nitrogen gas to displace ambient atmosphere, and the lid sealed to the container, the package is stored at a temperature between about 34° F and about 55° F.

The mixture of carbon dioxide and nitrogen produces a product superior to that obtained when either pure nitrogen or pure carbon dioxide is used alone. For example, if pure carbon dioxide is used, the shelf life is relatively short (about one week) and there is a tendency for an excessive amount of moisture to be present in the container. Moreover, when the gas mixture is substantially 100 percent carbon dioxide, an excessive volume of gas is absorbed by the product, resulting in a reduced pressure within the container, which eventually is distorted, thereby interfering with its merchandising appeal. If the concentration of the carbon dioxide is reduced much below about 30 percent, the reliable shelf life of the product is not much greater than about one week.

A mixture of gas in the range of about 30 percent to about 70 percent carbon dioxide, with a balance being nitrogen, provides a shelf life of up to sixteen weeks, with best results being obtained when the mixture is 50 percent $CO_2$ and 50 percent nitrogen.

What is claimed is:

1. A package of food adapted for storage at temperatures between about 34° F. and about 55° F. comprising a container of air-impervious material, potatoes peeled and cooked to a moisture content in the range of from about 70 percent to 85 percent by weight disposed in the container, a mixture of carbon dioxide and nitrogen gas in the container around the potatoes, the carbon dioxide in the gas mixture being present in the amount between about 30 percent and about 70 percent by volume with the balance being substantially nitrogen, and means sealing the container to prevent the gas mixture from being removed from the container or diluted by gas outside the container.

2. A package according to claim 1 in which the container is made of a self-supporting material.

3. A method for preserving potatoes, peeled and cooked to a moisture content of from about 70 percent to 85 percent by weight for storage at temperatures between about 34° F. and about 55° F., the method including the steps of disposing the potatoes in an air-impervious container, displacing air from the container with a mixture of carbon dioxide and nitrogen gas in which the carbon dioxide is present in the amount between about 30 percent and about 70 percent by volume with the balance being substantially nitrogen, and sealing the container to confine the gas mixture therein so that the gas mixture is prevented from being removed from the container or diluted by gas outside the container.

4. A method according to claim 3 in which the carbon dioxide and nitrogen gas are present in substantially equal amounts.

5. A method according to claim 3 which includes the step of refrigerating the sealed container between about 34° F and about 55° F.

6. A method according to claim 3 wherein the carbon dioxide is present in an amount of about 70 percent by volume, the balance being nitrogen.

7. A method according to claim 3 and including the steps of disposing the potatoes in a container open at its top, placing a lid loosely on top of the container, injecting the gas mixture of carbon dioxide and nitrogen at one point of the container to drive air from the container at another point, and sealing the lid to the container to make a hermetically sealed package.

* * * * *